United States Patent [19]

Hanke

[11] Patent Number: 5,444,250

[45] Date of Patent: Aug. 22, 1995

[54] OPTICAL WARM STOP WITH FRESNEL TYPE REFLECTIVE SURFACE

[75] Inventor: Dietmar Hanke, Mission Viejo, Calif.

[73] Assignee: Hughes Aircraft Company, Los Angeles, Calif.

[21] Appl. No.: 290,314

[22] Filed: Aug. 15, 1994

[51] Int. Cl.$^6$ .............................................. G01J 5/08
[52] U.S. Cl. ........................................ 250/352; 250/353
[58] Field of Search .................... 250/352, 353, 370.15

[56] References Cited

U.S. PATENT DOCUMENTS

| | | | |
|---|---|---|---|
| 4,990,782 | 2/1991 | Wellman et al. | 250/352 |
| 5,225,931 | 7/1993 | Stavraudis | 250/352 |
| 5,298,752 | 3/1994 | Wight | 250/352 |

*Primary Examiner*—Davis L. Wallis
*Assistant Examiner*—Richard Hanig
*Attorney, Agent, or Firm*—Wanda K. Denson-Low; Georgann S. Grunebach

[57] ABSTRACT

An infrared imaging system (10) has a detector assembly (12) positioned for viewing infrared radiation from a subject (20), and a housing (18) enclosing the detector assembly for maintaining the detector assembly at a temperature lower than a temperature of an environment outside the housing, the housing having a window (42) for transmission of radiation from the subject to the detector assembly. A cold stop (46) is located within the housing and a warm stop (48) is located outside the housing for transmitting radiation via their respective apertures (50, 52) from the subject to the detector assembly. The warm stop has a planar retroreflective surface (62) for reflecting rays from the detector assembly back to the detector assembly, thereby to minimize thermal noise. The retroreflective surface is profiled with grooves (66) arranged in a configuration for directing the rays of radiation back to the detector assembly, the configuration of grooves being a Fresnel configuration (62) or a kinoform configuration (62A) or a binary configuration (62B). Any desired location of the warm stop may be employed, even within a lens assembly (26), and any desired configuration of the shape of the aperture may be employed such as a rectangular or square shaped aperture.

12 Claims, 1 Drawing Sheet

OPTICAL WARM STOP WITH FRESNEL TYPE REFLECTIVE SURFACE

BACKGROUND OF THE INVENTION

This invention relates to infrared optical detection and imaging systems having a detector in a low temperature environment with an optical stop which reflects the detector upon itself to minimize interference with extraneous thermal radiation and, more particularly, to the use of a warm stop located outside the low temperature environment for limiting the field of view, and wherein the warm stop is configured as a flat reflecting plate having a Fresnel type surface profile including alternatively kinoform and binary surface profiling.

Infrared detection and imaging systems are employed in a large number of situations, such as night vision systems by way of example, wherein infrared radiation emitted by a subject is to be detected by a detector assembly having a single detector, typically a solid state detector, or a plurality of detectors for obtaining data of the subject. In the case of the single detector, the radiation may be scanned past the detector in a two dimensional scan to provide a two dimensional data field or image of the subject. In the case of a system employing the plurality of detectors, the detectors may be arranged in a line array for providing a one-dimensional line image of a line of data points of the subject, and wherein the scene of the subject may be scanned in a direction perpendicular to the line image to provide a two dimensional data field or image of the subject. Alternatively, the plurality of detectors may be arranged in a two dimensional array to provide directly a two dimensional image of the subject. The detector assembly is positioned within a housing, generally referred to as a Dewar, which maintains the array of detectors in the requisite low temperature environment. A lens assembly is usually employed to focus the subject radiation upon the detector assembly, the lens assembly being located outside the Dewar.

To prevent thermal radiation from a heat source, other than the subject, from reaching a detector and thereby degrading the image of the subject, it is a common practice to construct the Dewar with an internal optical stop set to the maximum design aperture for the system, and to provide also an optical stop outside the Dewar to limit the radiation to the field of view of the subject. The optical stop within the Dewar is referred to as a cold stop, and the optical stop outside the Dewar is referred to as a warm stop. The cold stop is cold and thus radiates only a very small amount of radiation to the cold detector. The warm stop is optimally reflective serving to reflect the image of the cold detector back upon the detector. In this fashion, the detector views only itself in addition to the radiation propagating from the subject scene through the aperture in the stop. Thereby, each stop has succeeded in excluding radiation from impinging upon the detector from any source lying outside the field of view of the subject. In order to accomplish the operation of the warm stop in reflecting the detector upon itself, it is the practice to construct the stop as a low emissivity, high reflectivity, spherical surface positioned at or near a pupil with the center of its curvature centered on or near the center of the detector or the detector array.

A problem arises in that, in the case of the reflective warm stop, the construction of the stop as a section of a sphere occupies an excessively large amount of space within the optical path of the system. This generally requires the location of the stop to be adjacent to a window of the Dewar for optimal exclusion of unwanted radiation. In contrast, the lenses of a lens assembly employed to focus the radiation may be placed at a distance from the Dewar, this allowing replacement or adjustment of the lens assembly to accommodate different imaging situations, such as the imaging of a close subject or a distant subject.

As a further problem, it is desirable also to select a warm stop to match the specific field of view of the imaging situation, such as a narrow or a wide angle field of view. However, the replacement of the warm stop is difficult because of its location immediately in front of the Dewar window. Furthermore, the optimum aperture stop shape is often not circular, this resulting in a stop that generally lies out of the pupil plane as an unavoidable consequence of the geometry involved. For example, a rectangular aperture is desirable in the situation wherein a rectangular scene is to be imaged. The calculation of the optimum geometry is time consuming and the best fit necessarily compromises the stop's efficiency. Also, it would be much more convenient to have the warm stop located within the lens assembly so that both the lenses and the warm stop could be replaced in a single step to accommodate a change in field of view or a change in magnification while preserving optimum reflective warm stop efficiency. This is precluded by the necessity to locate the warm stop at the Dewar window.

SUMMARY OF THE INVENTION

The aforementioned problems are overcome and other advantages are provided, in accordance with the invention, by constructing the warm stop as a flat reflecting plate, rather than as a section of a spherical reflector. The flat reflecting plate of the warm stop is provided with either a Fresnel (either spherical or conical) profiled surface or a kinoform profiled surface or a binary profiled surface facing the Dewar window. The stop aperture is cut into the material of the warm stop to closely match the shape and size of the pupil. This construction of the warm stop provides freedom in the locating of the warm stop, such that the warm stop may be located even within the lens assembly. This construction of the warm stop also provides freedom in the configuring of the shape of the aperture of the warm stop permitting even a rectangular or square shaped aperture, by way of example. The aperture may be centered along the axis of the Dewar window, or offset from the axis. While the invention is described in terms of a construction of a warm stop, it is to be understood that the construction of the invention may be applied also to the construction of a cold stop if desired, as well as to the construction of a stop in an imaging system other than an infrared imaging system.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element in the different figures.

DETAILED DESCRIPTION

Figure 1:
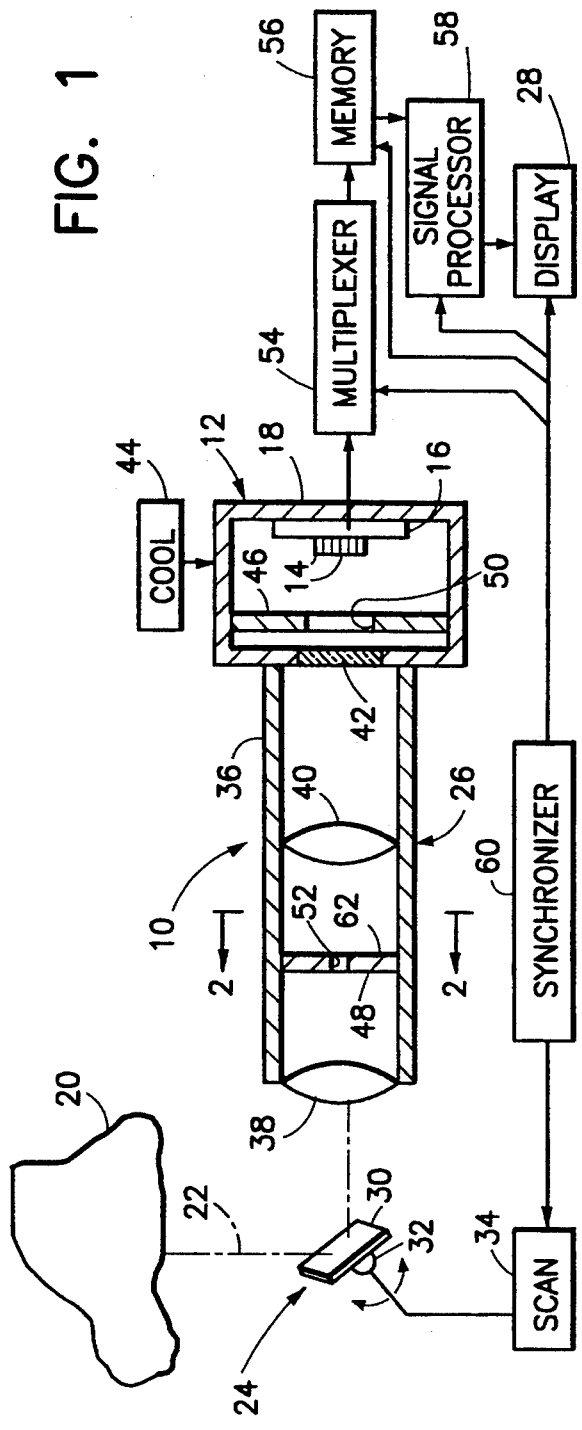
FIG. 1 is a diagrammatic view of an infrared imaging system including a detector assembly within a Dewar, a lens assembly for focussing radiation from a subject upon the detector assembly, and a warm stop constructed in accordance with the invention and located within the lens assembly.
Figure 5:
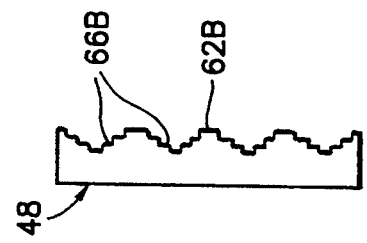
FIG. 5 shows diagrammatically a sectional view of a third embodiment of the warm stop showing binary Fresnel grooves.

With reference to FIG. 1, an infrared imaging system 10 includes a detector assembly 12 having a plurality of detectors 14 arranged in a linear array upon a supporting base 16 within a housing 18. Rays of infrared radiation emitted by a subject 20 propagate along an optical path 22 via a scanner 24, and are focussed by a lens assembly 26 to provide a line image of a portion of the subject 20 upon the array of the detectors 14. Operation of the scanner 24 provides a sweeping of successive lines of the image of the subject 20 across the detectors 14 to provide for a two dimensional image of the subject 20 which is to be displayed, in a manner to be described, upon a display 28. The scanner 24 comprises a mirror 30 which is pivoted in a scanning movement about a pivot 32 by a scan motor 34. The lens assembly 26 comprises a support 36 extending from the housing 18, and a plurality of lens elements of which two lens elements 38 and 40 are shown by way of example. The lens elements 38 and 40 are positioned by the support 36 for directing the rays of radiation through a window 42 of the housing 18 to impinge upon the detectors 14. Typical materials employed for construction of the window 42 and the lens elements 38 and 40 include zinc selenide, zinc sulfide, germanium, and silicon, by way of example, these materials being transparent to infrared radiation.

The housing 18 is constructed as a Dewar and is cooled by a cooling unit 44 for operating the detectors 14 at a temperature much colder than the external environment, typically at liquid nitrogen or liquid helium temperatures as may be required by the material of the detectors. A cold stop 46 is provided within, and supported by, the housing 18 between the window 42 and the array of the detectors 14, and a warm stop 48 is located outside the housing 18 in front of the window 42. The cold stop 46 has an aperture 50 sized to admit a field of view of radiation up to a maximum field of view, the cold stop 46 excluding radiation outside the maximum field of view. The warm stop 48 has an aperture 52 sized to admit a field of view of radiation up to a desired field of view, the cold stop 46 excluding radiation outside the desired field of view. The desired field of view admitted by the warm stop 48 is less than or equal to the maximum field of view admitted by the cold stop 46. Each of the stops 46 and 48 is provided with a reflecting surface facing the array of detectors and configured to reflect thermal radiation emitted by the detectors 14, and lying outside the respective fields of view, back to the detectors 14, thereby to inhibit extraneous thermal radiation from being received by the detectors 14.

Optical energy received by the detectors 14 is converted to electrical signals by the detectors 14, the electrical signals carrying image data of the subject 20. The detectors 14 output their signals to a multiplexer 54 which may include well known sampling and digitizing circuitry (not shown). Also included in the imaging system 10 are a memory 56, a signal processor 58, and a synchronizer 60. In the operation of the system 10, the detector signals are scanned by the multiplexer 54 to provide digital signal samples which are stored in the memory 56. The sampling and multiplexing operations of the multiplexer 54 and the addressing and storing operations of the memory 56 are controlled by timing signals generated the synchronizer 60. The stored signals are extracted from the memory 56 by the signal processor 58, which may include image enhancement circuitry (not shown), and applied by the processor 58 to the display 28 for presentation as the image of the subject 20. Operations of the scan motor 34, the display 28 and the signal processor 58 are synchronized by timing signals of the synchronizer 60 to the operations of the multiplexer 54 and the memory 56.

Figure 3:
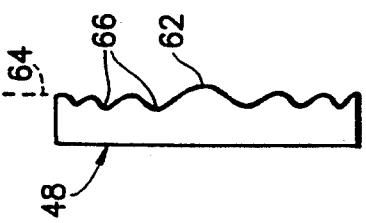
FIG. 3 shows diagrammatically a sectional view of a first embodiment of the warm stop showing smooth curved Fresnel grooves.
Figure 2:
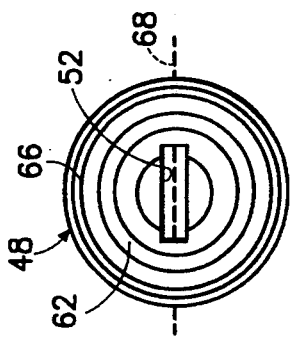
FIG. 2 shows a plan view of the warm stop taken along the line 2—2 in FIG. 1, with the Fresnel grooves being indicated diagrammatically, and wherein a rectangular aperture is shown by way of example.

With reference to FIGS. 1-5, and in accordance with the invention, the warm stop 48 has a planar configuration wherein the reflecting surface 62 of the warm stop 48 is disposed generally along a plane 64 and is formed of a pattern of Fresnel grooves 66, as shown in FIGS. 2 and 3. Due to the planar configuration of the warm stop 48, the aperture 52 may be provided with any desired configuration, and is shown in FIG. 2 as having a rectangular configuration to accommodate a linear scanning by the scanner 24 along a line 68 which is perpendicular to a line of the array of the detectors 14. By way of alternative embodiments of the invention, the detector assembly 12 may have only a single one of the detectors 14, and the scanner 14 might provide a spiral scan, in which case the aperture 52 would be configured with a circular shape. Alternatively, the detector assembly 12 may have a two dimensional array of the detectors 14 for direct viewing of the subject, in which case the scanner 24 would be eliminated and the aperture 52 would be configured with a square, circular or other shape matching the configuration of the bundle of rays within the optical system of the assembly 26. Presumably, the warm stop is placed at the site of a pupil of the lens assembly, in which case the stop aperture closely matches the shape and size of the pupil.

As is well known in the design of grooves of Fresnel elements including lenses and reflectors, the spacings, sizes and locations of the grooves are selected to focus parallel rays upon a focal point located at a desired distance from the plane of the grooves and positioned either on a central axis of the Fresnel element or displaced from the central axis. Therefore, by constructing the warm stop 48 of Fresnel grooves, the warm stop 48 may be located, in accordance with a feature of the invention, at a desired distance form the window 42, wherein the configuration of the grooves 66 is selected to reflect thermal radiation emitted from the array of the detectors 14 back upon the array of the detectors 14. By way of example, the warm stop 48 may be located within the lens assembly 26 and, if desired, may even be located between optical elements of the lens assembly such as between the lens elements 38 and 40, as shown in FIG. 1.

Figure 4:
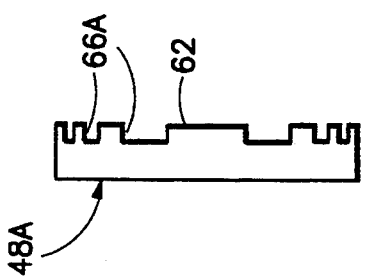
FIG. 4 shows diagrammatically a sectional view of a second embodiment of the warm stop showing kinoform Fresnel grooves.

The warm stop 48 may be constructed in an alternative configuration of a warm stop 48A depicted in FIG. 4 wherein the smooth curved surface of the array of grooves 66 of the stop 48 is replaced in the stop 48A with a kinoform configuration of grooves 66A. Furthermore, the warm stop 48 may be constructed in an alternative configuration of a warm stop 48B depicted in FIG. 5 wherein the smooth curved surface of the array of grooves 66 of the stop 48 is replaced in the stop 48B with a binary configuration of grooves 66B. In any of the foregoing embodiments of the warm stop, the surface profile of the reflecting surface is either machined, diamond turned, of etched into the material of the stop. With respect to the reflecting surface, the surface's radius of curvature or dominant order focus lies at or near the focal plane. If the aperture of the warm stop lies in the center of the stop, it may be possible to achieve adequate optical performance with a conical instead of a spherical Fresnel surface profile. The reflecting surface 62, and the corresponding surfaces 62A and 62B of the warm stops 48A and 48B, respectively, can be coated with a low emissivity material such as gold to further enhance the reflecting surface efficiency.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. In an optical system comprising a detector assembly positioned for viewing a subject, and wherein the optical system includes a stop having a retroreflective surface for reflecting rays from the detector assembly back to the detector assembly, the stop having an aperture for transmitting rays of radiation from the subject to the detector assembly, the improvement wherein
said retroreflective surface is profiled with grooves arranged for directing the rays of radiation back to said detector assembly.

2. A system according to claim 1 wherein said retroreflective surface is planar, and said grooves provide a Fresnel configuration to said retroreflective surface.

3. A system according to claim 1 wherein said retroreflective surface is planar, and said grooves provide a kinoform configuration to said retroreflective surface.

4. A system according to claim 1 wherein said retroreflective surface is planar, and said grooves provide a binary configuration to said retroreflective surface.

5. A system according to claim 1 wherein said retroreflective surface is coated with a low emissivity material.

6. A system according to claim 5 wherein said low emissivity material is gold.

7. A system according to claim 1 wherein said optical system further comprises a lens assembly for focussing the radiation of the subject upon the detector assembly, and said stop is located within said lens assembly.

8. A system according to claim 1 wherein said optical system further comprises a lens assembly having a plurality of lens elements for focussing the radiation of the subject upon the detector assembly, and said stop is located between lens elements of said lens assembly.

9. A system according to claim 1 wherein said detector assembly comprises at least one detector of infrared radiation, said detector assembly being located within a Dewar having a window for transmitting infrared radiation, and said stop is located outside of said Dewar.

10. An infrared imaging system comprising
a detector assembly positioned for viewing infrared radiation from a subject, a housing enclosing said detector assembly for maintaining said detector assembly at a temperature lower than a temperature of an environment outside said housing, said housing having a window for transmission of radiation from said subject to said detector assembly;
a first stop having a relatively large aperture located within said housing for transmitting radiation from said subject to said detector assembly;
a second stop located outside said housing and having an aperture for transmitting radiation from said subject to said detector assembly, the aperture of said second stop being smaller than or equal in size to the aperture of said first stop;
wherein said second stop has a planar retroreflective surface for reflecting rays from the detector assembly back to the detector assembly, and said retroreflective surface is profiled with grooves arranged in a configuration for directing the rays of radiation back to said detector assembly, said configuration of grooves being a Fresnel configuration or a kinoform configuration a binary configuration.

11. A system according to claim 10 wherein said optical system further comprises a lens assembly for focussing the radiation of the subject upon the detector assembly, and said second stop is located within said lens assembly.

12. A system according to claim 10 wherein said optical system further comprises a lens assembly having a plurality of lens elements for focussing the radiation of the subject upon the detector assembly, and said second stop is located between lens elements of said lens assembly.

* * * * *